United States Patent [19]

Baker

[11] Patent Number: 4,925,281
[45] Date of Patent: May 15, 1990

[54] ZOOM LENS

[75] Inventor: James G. Baker, Bedford, N.H.

[73] Assignee: Polaroid Corporation, Cambridge, Mass.

[21] Appl. No.: 426,965

[22] Filed: Oct. 26, 1989

Related U.S. Application Data

[63] Continuation of Ser. No. 156,409, Feb. 16, 1988.

[51] Int. Cl.$^5$ ............................................. G02B 13/18
[52] U.S. Cl. ..................................... 350/423; 350/432
[58] Field of Search ................................ 350/423, 432

[56] References Cited

U.S. PATENT DOCUMENTS 3,305,294 12/1964 Alvarez .
3,583,790 6/1971 Baker .
4,457,592 7/1984 Baker .
4,650,292 3/1987 Baker et al. .

Primary Examiner—Rodney B. Bovernick
Assistant Examiner—Rebecca D. Gass
Attorney, Agent, or Firm—Francis J. Caufield

[57] ABSTRACT

Zooming optical systems in which the effective focal length changes required for changing image scale and focus maintenance are brought about by movement of various system elements across the optical axis rather than along it as is the usual case. The zooming systems are suitable for use in a variety of applications including visual instrumentation and photographic systems.

15 Claims, 4 Drawing Sheets

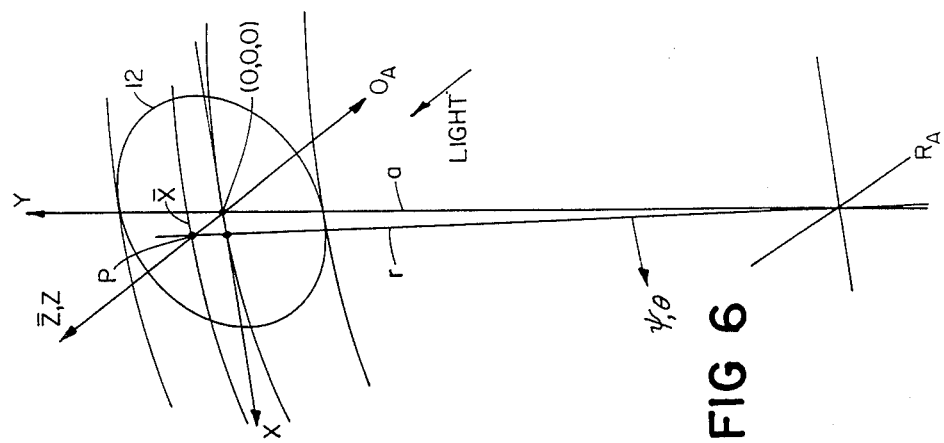
FIG 6
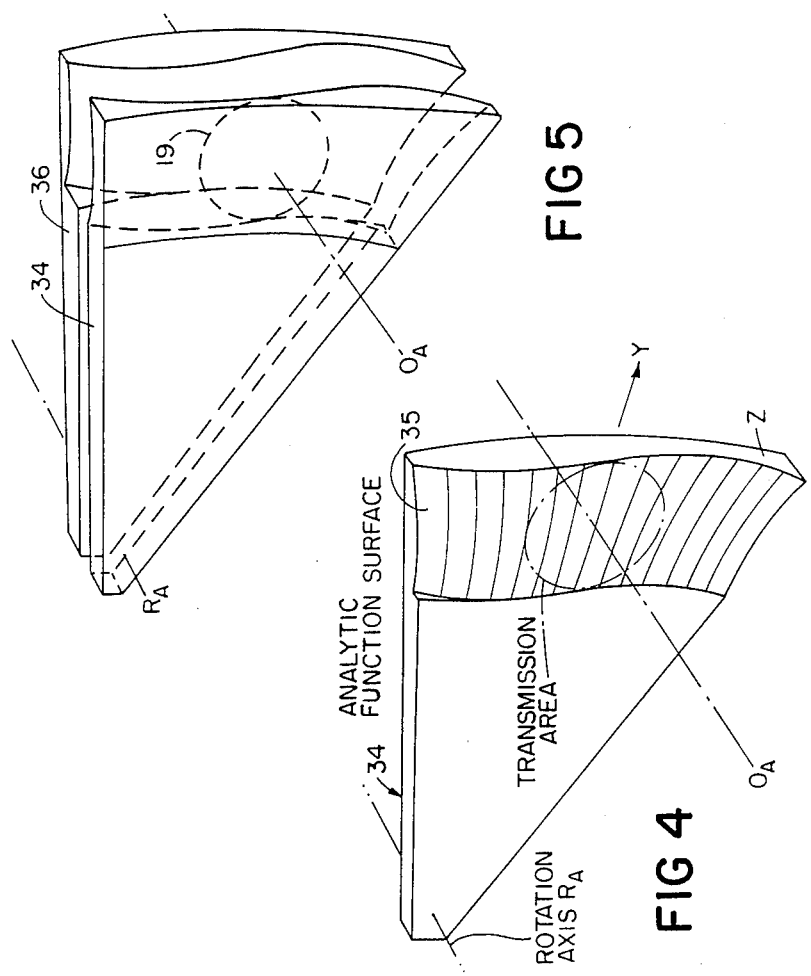
FIG 5
FIG 4

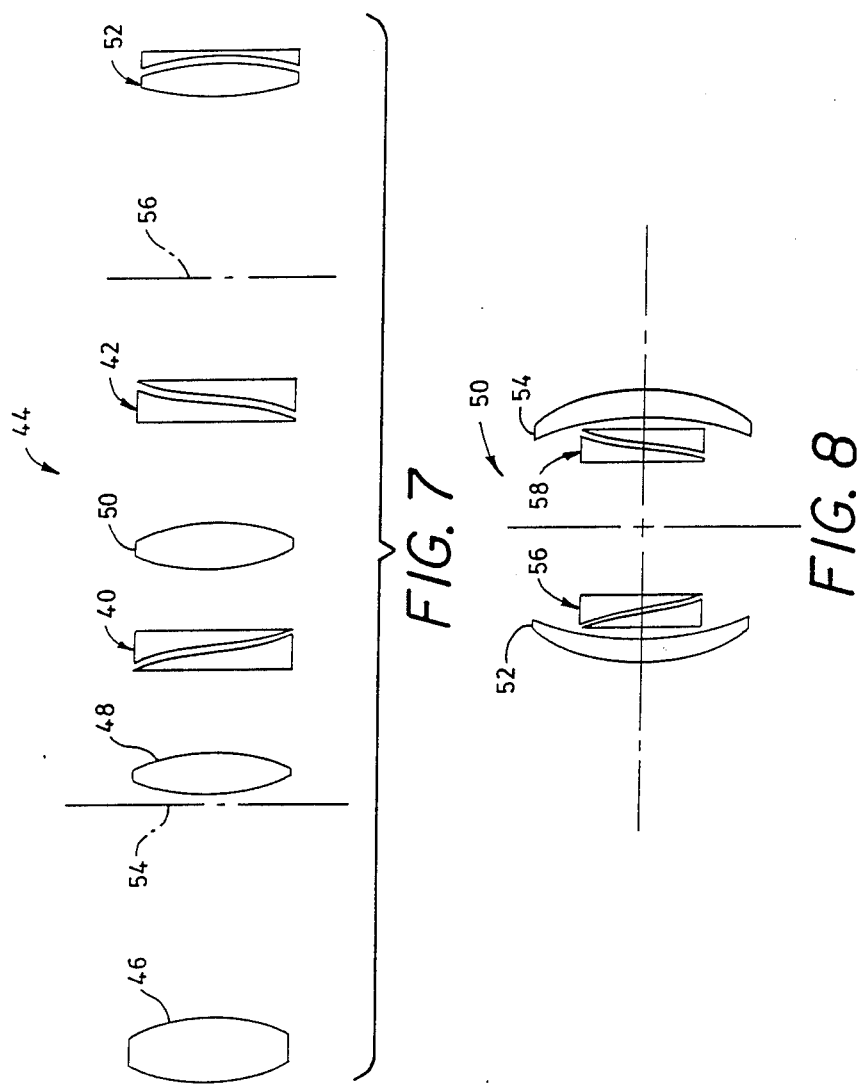

ZOOM LENS

This is a continuation of application Ser. No. 156,409, filed Feb. 16, 1988.

BACKGROUND OF THE INVENTION

This invention generally relates to zoom lenses and, more particularly, to zoom lens systems in which zooming action and focusing are effected by relative movement across the optical axis of selectively deformed non-rotational plates that are themselves arranged in pairs spaced along the optical axis.

As is well known, a zoom lens is one in which the focal length can be varied continuously by moving one or more of the lens components along the axis, the image position being maintained in a fixed plane by some means, either optical or mechanical. They were originally developed to fulfill the need in the motion picture and television industries to be able to simulate tracking shots without having to actually move a camera. This, of course, required an optical system capable of continuously changing the scale of the scene from some fixed vantage point while at the same time conveniently keeping the image in focus as it changed in size at a fixed location behind the lens corresponding to either the film plane or the plane of some photosensitive device such as a vidicon tube.

Since image scale is proportional to equivalent focal length zoom systems necessarily are those of continuously adjustable equivalent focal length. And, since equivalent focal length is a function of the individual focal lengths of the components of a lens and the axial spacing between them, a continuous variation in equivalent focal length has been traditionally achieved by causing one or more of the component spacings to vary. Thus, the underlying basis for changing image scale in known zoom systems is to change at least one spacing between the series of positive and negative components which usually comprise the lens. This, however, also alters the lens-to-image distance for maximum sharpness. Consequently, altering component spacing, while achieving changes in image scale, also without additional compensation introduces changes in focus throughout the zooming action. Focus change can be compensated for by changing the lens-to-film plane distance and re-positioning the film plane may be preferred if the lens is large and the film plane easier to move. However, this is not usually done in the true zooming system, but where it is, the systems are referred to as varifocal.

In the true zoom lens, other forms of compensation are traditionally employed. These have been mentioned previously, and one is referred to as mechanical and the other as optical.

With mechanical compensation, the movement of the components responsible for the change in equivalent focal length is linked with the movement of another component or components whose movement in turn compensates in advance for the potential change of back focus and thus maintains the image acceptably sharp throughout some zoom range, the ratio of maximum to minimum equivalent focal length. Since the two movements are unequal, they are typically linked by a cam arrangement which forces their correct functional movement.

In optically compensated zoom lenses, two or more components are connected so that they travel together over the same distance to keep the image sharp at the various focal length settings of the zoom lens.

Beyond these basic arrangements, zoom lenses become more complex as the zooming requirements increase. This comes about because of the need to have additional components for aberration control, a problem which becomes increasingly difficult with increases in the zooming range. Thus, the general trend is for zoom lenses to contain more components and become more complex and expensive as zoom ratios become higher.

Another consideration in the design of zoom lenses is the desirability of maintaining constant image illumination throughout the range of operation. This requires compensation for changes in the relative aperture introduced by changes in the focal length. Here again, mechanical compensation, but in the form of a variable diaphragm, is often used to solve the problem so that there is no need for making exposure time adjustments because of changing aperture conditions. The favored approach, however, is to use an afocal zoom section ahead of an imaging system in which the aperture remains constant. Here, the afocal attachment is made to change image scale with its aperture matching or exceeding the aperture of the imaging portion so that changes of magnification in the afocal zoom section do not affect the relative aperture of the overall lens. Many recent systems incorporate the stop even into the zoom portion as long as it stays ahead of the fixed part of the zoom and is not interfered with by the zoom action. The stop that is put that far into the zoom system in terms of its image will still have the same aperture ratio at the final image, which is all that is required. That is, the exit pupil is fixed in size and location.

Other features which are known to have been used in zoom lenses include automation of the zooming action as well as remotely controlled zooming action. It is also known to adapt zoom lenses for use in still cameras, which usually have larger formats and field angles than movie cameras.

Thus, multicomponent zoom lenses are wellknown in the art and are more or less elaborate, depending primarily on the zoom ratio requirements. However, all are in principle based on the fundamental idea that image scale changes can be brought about by changing the spacing between the various components, positive, negative, or both, to achieve the necessary optical power changes along with compensation for shifts in back focal length.

It is the primary object of the present invention to provide the art with zoom lenses which are based on quite another type of lens motion to affect the optical power changes needed for zooming action and focusing. This new action involves the movement of distorted pairs of plates across, rather than along, the optical axis as in the prior art and represents a novel approach to zooming action and focusing which exploits the optical properties of transversely movable deformed plates.

In 1967 in U.S. Pat. No. 3,305,294, Luis Alvarez described a pair of distorted surfaces defined mathematically with a cubic equation and movable across the optical axis to produce a continuously variable dioptric power that simulated the action of rotationally symmetric shaped dioptric lenses.

In 1971, James G. Baker in U.S. Pat. No. 3,583,790 pointed out that the addition of higher-order terms, particularly the fifth, provides aberration control in addition to the focusing action introduced by Alvarez and presented refined embodiments shown in 1984 in his U.S. Pat. No. 4,457,592.

U.S. Pat. No. 4,650,292 of James G. Baker and William T. Plummer describes the geometry of a pair of distorted surfaces which can be rotated across the optical axis about an offset axis parallel to the optical axis to achieve focusing action and aberration control.

However, none of the literature to date suggests the use of such deformed plates for combined zooming and focusing purposes. As will be seen, the present invention exploits the properties of transversely movable plates to achieve zooming action and focusing in a variety of ways.

Other objects of the invention will in part be obvious and will in part appear hereinafter. Accordingly, the invention comprises the optical elements and systems possessing the construction, combination and arrangement of elements which are exemplified in the following detailed description.

SUMMARY OF THE INVENTION

This invention in general relates to zooming optical systems and in particular to zooming systems in which the effective focal length changes required for change in image scale are brought about by movement of various system elements across the optical axis rather than along it as is the usual case.

The zooming systems of the invention are suitable for use in a variety of applications including visual instrumentation and photographic systems.

In their simplest form, the zooming systems comprise a pair of components spaced apart from one another along an optical axis. Each component includes a pair of adjacent transparent plates that are arranged generally perpendicular to the optical axis and adapted for movement across it. Each plate in turn includes at least one non-rotationally symmetric surface that is shaped so that the components jointly image in a fixed plane behind the optical system and so that the displacement of the plates across the optical axis continuously varies the system effective focal length over a predetermined range to change image scale while throughout preserving constant back focal length.

The basic form in which the adjacent plates simulate equivalent rotationally symmetric dioptric elements can be made more complex or used in combination with other fixed elements depending on the particular purpose and degree of performance sought. For example, more than one group of adjacent plates can be used in tandem fashion to distribute equivalent dioptric power and the work attributed to the non-rotationally symmetric surfaces in each component can be shared between more than one plate if required.

The adjacent plates can be so shaped that movement across the optical axis may be just by a linear sliding motion or via a rotation about a pivoting axis offset and parallel to the optical axis. In each component, one plate can remain fixed and one or more moved, two can be moved in equal and opposite directions, or other combinations of stationary and movable action can be implemented.

The shape of the required non-rotationally symmetric surfaces are describable as polynomials in Cartesian form with the simplest dioptric simulation for sliding action requiring a non-zero third order term. For additional correction with this motion, fifth and higher orders may be added and for rotatory action a non-zero fourth order term is necessary with fifth and higher orders possibilities for additional control of image quality.

Preferably, the plates are arranged in a fashion so that any bending of the optical axis caused by one component tends to be offset by the following component.

DESCRIPTION OF THE DRAWINGS

The novel features that are consider characteristic of the invention are set forth with particularity in the appended claims. The invention itself, however, both as to its organization and method of operation and fabrication, together with other objects and advantages thereof, will best be understood from the following detailed description of the illustrated embodiments and fabrication methods when read in connection with the accompanying drawings wherein like numbers have been employed in the different figures to denote the same parts and wherein:

FIG. 4 is a diagrammatic perspective of another form of element that can be used in the inventive zoom system;

FIG. 5 is a diagrammatic perspective showing in combination a pair of the elements of FIG. 4;

FIG. 6 is a coordinate system useful for describing the shapes of the element of FIG. 4;

FIG. 7 is a diagrammatic elevation showing the inventive zoom system as part of a terrestrial telescope; and FIG. 8 is a diagrammatic elevation showing the zoom system as part of a symmetric photographic objective.

DETAILED DESCRIPTION

Figure 1:
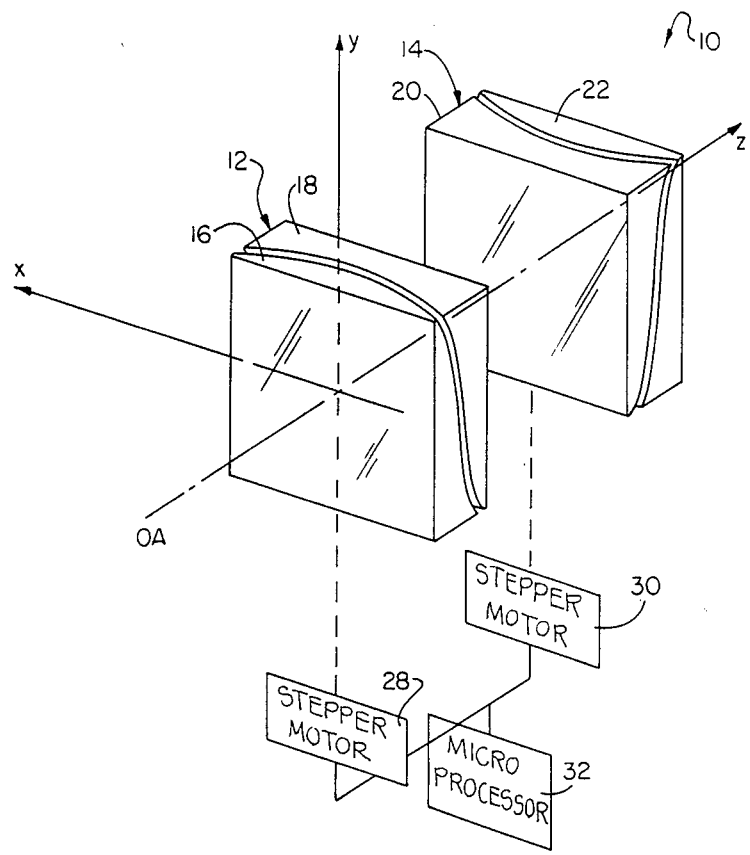
FIG. 1 is a diagrammatic perspective drawing showing the inventive zooming system in simplest form.

The zooming optical system of the invention in its most direct and simplest form is shown in FIG. 1 at 10. As seen there, system 10 comprises two optical components, 12 and 14, spaced apart along axis Z which is taken as the system optical axis (OA) with light traveling from front to back through the system.

Each component, 12 and 14, in turn comprises a pair of optically transparent plates arranged aside of one another; component 12 includes plates 16 and 18 while component 14 includes plates 20 and 22.

Figure 2:
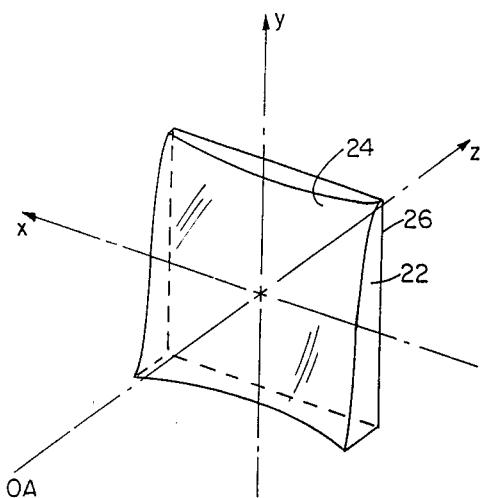
FIG. 2 is a diagrammatic perspective showing one of the elements of the system in FIG. 1.

All of the plates (16–22) include one plano surface and one non-rotationally symmetric surface as is evident from FIG. 1 and more clearly illustrated in FIG. 2 in which plate 22 is shown separately with front non-rotationally symmetric surface 24 and plano rear surface 26.

Figure 3:
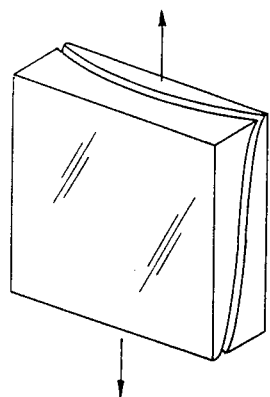
FIG. 3 is a diagrammatic perspective showing in combination a pair of elements like that of FIG. 2.

Each non-rotationally symmetric surface used is shaped such that relative transverse motion of two closely identical adjacent shapes as shown in FIG. 3 produces a continuously variable dioptric power that simulates the action of a rotationally symmetric dioptric lens. These surface shapes are mathematically representable in polynomial form by expressions of at least third order. The kind of optical action which each of the components, 12 and 14, provides arises from the fact that a generalized surface, defined in two variable terms by odd and even powers in all combinations up to and including the maximum assigned degree, combined with another such surface, one reversed with respect to the other, causes in summation the canceling of the terms of odd order in the transverse sliding direction. The resulting polynomial of even order terms thus immediately resembles the power series representation of the rotational shape of a simple dioptric lens. It remains only to obtain the previously undetermined coefficients by equating these in one-to-one correspondence to the known coefficients of the rotationally symmetrical lens.

In simplest form, where only spherical elements are simulated, each of the non-rotational surfaces is represented by a polynomial having at least a non-zero term of the third order where:

$$Z = K_1(xy^2 + \tfrac{1}{3}x^3)$$

in which $K_1$ is an assignable constant which determines the power variation of the equivalent spherical dioptric element and takes in opposite algebraic signs for each plate, and Z represents the surface depth measured from a plane at the origin of coordinates as shown in FIG. 2 and normal to the optical axis.

If the components, 12 and 14, are to simulate rotationally symmetric aspheres for use in improving the overall performance of system 10, then the non-rotationally symmetric surfaces are represented by:

$$Z = ax + cx^3 + 3cxy^2 + gx^5 + 10/3gx^3y^2 + 5gxy^4$$

where a, c and g are assignable constants.

With each of the components 12 and 14 capable then of simulating a continuous range of equivalent dioptric power, whether spherical or aspherical for better correction, the power of system 10 can be expressed by:

$$\phi(x) = \phi_{12}(x) + \phi_{14}(x) - d_1\phi_{12}(x)\phi_{14}(x)$$

where $\phi(x)$ is the total dioptric power, $\phi_{12}(x)$ and $\phi_{14}(x)$ the dioptric power of component 12 and 14, respectively, $d_1$ the axial separation between the two components, and where all quantities, except $d_1$, are functions of the non-rotationally symmetric surface shapes and their displacements in x.

For zooming action, $\phi(x)$, or the system effective focal length, must change to effect changes in image scale while system 10 preserves image focus in a fixed plane behind it. Or, equivalently, the system back focus must remain fixed while its effective focal length continuously varies over a predetermined range.

To assure a constant back focus, a second condition is imposed on the system design by the relationship for the back focus of two spaced apart dioptric elements given by:

$$\phi(x)d = 1 - d_1\phi_{12}(x)$$

or more conveniently by:

$$\phi(x) = \frac{\phi_{12}(x)}{1 - \phi_{14}(x)d}$$

This last expression gives the ratio of powers for the components and shows that the power distribution is not arbitrary for a given system power, but is in fixed proportions.

With the overall zoom ratio given by:

$$\phi_t(x)/\phi_w(x),$$

where $\phi_t$ is the telephoto or larger system effective focal length and $\phi_w$ the wide angle or shorter, the foregoing equations are solved for the necessary power ranges, and then the shapes of the non-rotationally symmetric surfaces are determined.

One can think of the operation of system 10 in terms of its simulated variable dioptric elements. Component 12 is now of variable power up front and can be more or less positive or negative, that is can go from plus to minus in the extreme. Likewise, component 14 in back can also be made to vary over some equivalent dioptric power range, but where the power ratios between the two component extremes is constrained by formula to maintain back focus. If the front component 12 is made to range from plus to minus, then for zooming purposes this power variation is matched by the back component 14 going from minus to plus. In a fixed equivalent, you would have in one extreme a positive lens in front, preferably achromatized, and a negative one in back, also preferably achromatized, to give a telephoto overall. In the other extreme, the front would be negative and the back positive to give an inverted telephoto for wide angle purposes. In the same spacing, $d_1$, then, one can get a zooming action by just moving the plates (16–22) across the optical axis.

The required transverse displacements of plates (16–22) across the optical axis are made in accordance with the governing equation and can be effected in a coordinated manner through the use of stepper motors, 28 and 30, operating under control of a microprocessor 32 as seen in FIG. 1.

For the simplest system, the useful zooming ratio is restricted to perhaps no more than 30% at small relative apertures depending on the application, say, 1.5 to 1 or maybe 0.8 to 1.2 in EFL. Nevertheless, even the simplest form has utility and, while not suitable at large apertures for photographic application, does have use, for example, in ophthalmic purposes and in visual systems, or in high f-number photographic systems.

Where it is desired to rotate the nonrotationally symmetric plates to move them across the optical axis, differently shaped plates and surfaces are required. FIG. 4 at 34 shows the general shape needed which in polynomial form is described by:

$$Z = K_1(xy^2 + \tfrac{1}{3}x^3) - K_2x^3y + K_3xy^3 \text{ (See FIG. 6)}$$

where $K_1$ is an assignable constant and $K_2 = -\tfrac{1}{3}aK_1$ and $K_3 = -1/aK_1$.

Here, the non-rotationally symmetric surface forming part of plate 34 is indicated as 35. Plate 34 is shown in combination with another such plate 36 in FIG. 5 where the two are adjacent to one another and are moved across the optical axis by relative rotation about a displaced axis of rotation, $R_A$, that is offset from and parallel to the optical axis. As before, two pairs of spaced apart rotatable plates can be used in simplest form for modest zooming action, but the performance will be something less good than for the case of the transversely slidable spaced pairs due to additional asymmetries. However, higher order terms, above the needed forth power, can be included to offset image degradations introduced by the rotatary motion requirements, and the performance can thus be improved.

Whether associated pairs of plates are rotatory or slidable, they can be arranged for movement in various ways. Both can move, one can remain stationary and the other can move. Movement in components can be all in the same direction for focusing action and all in the other for zooming power changes or in other combinations if required.

In addition, there can be more than just a pair of plates per component and more than one component per zooming system. Power, for example, in any one component may be distributed over three or more plates, and overall system power over more than two components.

Aside from the power distribution, focusing and scale change action can be assigned to either the front or back group, focusing to be done by one and zooming by the other or these functions can be shared by both groups or throughout all of these or more than two.

Whatever the adopted number of components and plates turns out to be, it is preferable to arrange them as in FIG. 1 so that any deviation to the optical axis caused by plate prismatic action by any one group tends to be corrected by the following group. In FIG. 1, the axial arrangement would be $+, -, -, +$ if one considers just the upper edge section as a guide to what that shape would be for a rotationally symmetric dioptric element. As previously mentioned, the zooming action of the invention can be used in combination with other fixed elements for a variety of purposes. FIG. 7, for example, shows a pair of components 40 and 42 in a terrestrial telescope 44. Telescope 44 comprises, in addition to components 40 and 42, an objective 46, a field lens 48, a reimaging objective 50 and an occular 52. The objective 46 forms an image in plane 54 just ahead of the field lens 48, and this image is reimaged by objective 50 into plane 56 where it is observable via the occular 52. Components 40 and 42 are used here to change the size of the image in plane 56 while maintaining it stationary there.

For photographic purposes, the zooming system can be incorporated in a symmetric arrangement such as that shown in FIG. 8 at 50. System 50 comprises two menisci, 52 and 54, symmetrically disposed about a central stop and two pairs of sliding plates 56 and 58, similarly disposed.

The bulk of the system optical power is provided by the menisci, 52 and 54, which are symmetrically disposed to favorably correct the system, and the system focusing and zooming action is provided for by the pairs of sliding plates, 56 and 58.

It will be obvious to those skilled in the art that changes may be made in the above-described embodiments without departing from the scope of the invention. Therefore, it is intended that matters contained in the above description or shown in the accompanying drawings shall be interpreted as illustrative and not in a limiting sense.

What is claimed is:

1. A zoom lens comprising at least two distinct groups of adjacent plates where each of said groups is spaced from the other along an optical axis by a distance, d, where the power of the zoom lens, taken as $\phi(x)$ is given by:

$\phi(x) = \phi_i(x) + \phi_{ii}(x) - d\phi_i(x)\phi_{ii}(x)$, where $\phi(x)_i$ and $\phi(x)_{ii}$ are the powers of the respective groups of said zoom lens and x is the displacement of the plates across said optical axis, each group of adjacent plates including at least two nonrotationally symmetric surfaces closely spaced to one another compared with the spacing, d, separating said groups along said optical axis and shaped so that said groups jointly image in a fixed plane behind said zoom lens and so that said nonrotationally symmetric surfaces of each of said groups individually can be moved within its respective groups relative to one another across said optical axis to provide said zoom lens with a continuously variable effective focal length over a predetermined range to change image scale, the power of said zoom lens, $\phi(x)$, being further related to the powers of said groups and said distance, d, by the following relationships:

$\phi(x) = \phi_i(x)/[1 - \phi_{ii}(x) \times d]$, so that the image focus throughout the zoom range is preserved in said fixed plane.

2. The optical system of claim 1 further including means for moving said plates of said groups in coordination with one another so that the optical action of said groups are compensated one for the other.

3. The optical system of claim 2 wherein said nonrotationally symmetric surfaces are mathematically describable in Cartesian coordinates by preselected polynomial equations having a non-zero term of at least fourth order.

4. The optical system of claim 3 wherein said polynomial equations are of the form:

$$Z = K_1(xy^2 \tfrac{1}{3}x^3) - K_2x^3y + K_3xy^3$$

wherein $K_1$ is an assignable constant and $$K_2 = -\tfrac{1}{3}aK_1 \text{ and } K_3 = -1/aK_1.$$

5. The optical system of claim 1 wherein said nonrotationally symmetric surfaces of at least one of said groups are shaped so that the optical action which they effect by movement across said optical axis is by way of relative rotation of one with respect to another about a pivot axis offset and parallel to said optical axis.

6. The optical system of claim 1 wherein said nonrotationally symmetric surfaces of at least one of said groups are shaped so that the optical action which they effect by movement across said optical axis is by way of relative linear sliding action of one with respect to another.

7. The optical system of claim 6 wherein said nonrotationally symmetric surfaces are mathematically describable in Cartesian coordinates by preselected polynomial equations having a non-zero term of at least third order.

8. The optical system of claim 7 wherein said polynomial equation is of the form:

$$Z = K_1(xy^2 + \tfrac{1}{3}x^3)$$

where $K_1$ is an assignable constant, Z is the direction of said optical axis and represents the surface depth measured from a plane that is at the origin of coordinates and perpendicular to said optical axis.

9. The optical system of claim 6 wherein said nonrotationally symmetric surfaces are mathematically describable in Cartesian coordinates by preselected polynomial equations having a non-zero term of at least fifth order.

10. The optical system of claim 9 wherein said polynomial equation is of the form:

$$Z = ax + cx^3 + 3cxy^2 + gx^5 + 10/3gx^3y^2 + 5gxy^4$$

where a, c and g are assignable constants and Z is the surface depth measured with respect to a plane at the origin of coordinates and normal to said optical axis with Z along said optical axis.

11. The optical system of claim 1 wherein said group of adjacent plates are two in number symmetrically arranged.

12. The optical system of claim 1 wherein said non-rotationally symmetric surfaces of each group are structured and arranged for movement in equal and opposite directions across said optical axis.

13. The optical system of claim 1 wherein each group of adjacent plates simulates a rotationally symmetric dioptric element of variable power.

14. The optical system of claim 13 wherein the dioptric power of each of said simulated dioptric elements ranges from plus to minus.

15. The optical system of claim 1 wherein said non-rotationally symmetric surfaces of each group are arranged so that the deviation to said optical axis caused by any one group tends to be corrected by the following group.

* * * * *